United States Patent
Kalavar (10) Patent No.: US 8,073,129 B1
(45) Date of Patent: Dec. 6, 2011

(54) WORK ITEM RELATION AWARENESS FOR AGENTS DURING ROUTING ENGINE DRIVEN SUB-OPTIMAL WORK ASSIGNMENTS

(75) Inventor: Rajeev P. Kalavar, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 1335 days.

(21) Appl. No.: 11/243,436

(22) Filed: Oct. 3, 2005

(51) Int. Cl.
*H04M 3/00* (2006.01)

(52) U.S. Cl. .............. 379/265.01; 379/265.12

(58) Field of Classification Search ........... 379/265.01–265.02, 266.04, 265.12
See application file for complete search history.

(56) References Cited

U.S. PATENT DOCUMENTS

| | | |
|---|---|---|
| 4,163,124 A | 7/1979 | Jolissaint |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,008,930 A | 4/1991 | Gawrys et al. |
| 5,097,528 A | 3/1992 | Gursahaney et al. |
| 5,101,425 A | 3/1992 | Darland et al. |
| 5,155,761 A | 10/1992 | Hammond |
| 5,164,983 A | 11/1992 | Brown et al. |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |

(Continued)

FOREIGN PATENT DOCUMENTS

CA 2143198 1/1995

(Continued)

OTHER PUBLICATIONS

U.S. Appl. No. 11/243,437, filed Oct. 3, 2005, Hunter et al.

(Continued)

*Primary Examiner* — Rasha Al Aubaidi
(74) *Attorney, Agent, or Firm* — Sheridan Ross P.C.

(57) ABSTRACT

In one embodiment, a contact center 100 includes:
(a) a queue 208 to contain a pointer to a first contact from a first customer;
(b) a selector 220 to select a first agent to service the first contact, the first agent being a suboptimal selection for servicing the first contact and a second agent being an optimal selection for servicing the first contact; and
(c) a routing notification agent 232 to notify the first agent that the second agent was the optimal selection for servicing the contact; and/or, after delivery of the first contact to the first agent, notify the second agent that the first agent is the suboptimal selection for servicing the contact and that the second agent is the optimal selection for servicing the contact.

23 Claims, 6 Drawing Sheets

U.S. PATENT DOCUMENTS

| | | | |
|---|---|---|---|
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,870 A | 11/1997 | Maloney et al. |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,717,747 A | 2/1998 | Boyle, III et al. |
| 5,717,835 A | 2/1998 | Hellerstein |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,792 A * | 5/1999 | Miloslavsky ............ 379/265.11 |
| 5,905,793 A | 5/1999 | Flockhart et al. |
| 5,915,012 A | 6/1999 | Miloslavsky |
| 5,926,538 A | 7/1999 | Deryugin et al. |
| 5,926,539 A * | 7/1999 | Shtivelman ............ 379/266.01 |
| 5,930,786 A | 7/1999 | Carino, Jr. et al. |
| 5,937,051 A | 8/1999 | Hurd et al. |
| 5,937,402 A | 8/1999 | Pandit |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,647 A | 1/2000 | Nizzari et al. |
| 6,035,332 A | 3/2000 | Ingrassia et al. |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,046,762 A | 4/2000 | Sonesh et al. |
| 6,049,547 A | 4/2000 | Fisher et al. |
| 6,052,723 A | 4/2000 | Ginn |
| 6,055,308 A | 4/2000 | Miloslavsky et al. |
| 6,058,424 A | 5/2000 | Dixon et al. |
| 6,058,435 A | 5/2000 | Sassin et al. |
| 6,064,730 A | 5/2000 | Ginsberg |
| 6,064,731 A | 5/2000 | Flockhart et al. |
| 6,084,954 A | 7/2000 | Harless et al. |
| 6,088,441 A | 7/2000 | Flockhart et al. |
| 6,115,462 A | 9/2000 | Servi et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,332 B1 | 5/2001 | Anderson et al. |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,345,305 B1 | 2/2002 | Beck et al. |
| 6,353,810 B1 | 3/2002 | Petrushin |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,453,346 B1 | 9/2002 | Garg et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,493,695 B1 | 12/2002 | Pickering et al. |
| 6,535,600 B1 | 3/2003 | Fisher et al. |
| 6,535,601 B1 | 3/2003 | Flockhart et al. |
| 6,557,003 B1 | 4/2003 | Powers |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,597,685 B2 | 7/2003 | Miloslavsky et al. |
| 6,614,903 B1 | 9/2003 | Flockhart et al. |
| 6,650,748 B1 | 11/2003 | Edwards et al. |
| 6,671,263 B1 | 12/2003 | Potter et al. |
| 6,691,159 B1 | 2/2004 | Grewal et al. |
| 6,704,409 B1 | 3/2004 | Dilip et al. |
| 6,704,410 B1 | 3/2004 | McFarlane et al. |
| 6,707,903 B2 | 3/2004 | Burok et al. |
| 6,751,669 B1 | 6/2004 | Ahuja et al. |
| 6,754,333 B1 | 6/2004 | Flockhart et al. |
| 6,760,429 B1 | 7/2004 | Hung et al. |

| | | | |
|---|---|---|---|
| 6,766,013 | B2 | 7/2004 | Flockhart et al. |
| 6,766,014 | B2 | 7/2004 | Flockhart et al. |
| 6,865,267 | B2 | 3/2005 | Dezonno |
| 6,886,037 | B1 | 4/2005 | Brewer et al. |
| 6,922,466 | B1 * | 7/2005 | Peterson et al. ........... 379/88.09 |
| 6,965,868 | B1 | 11/2005 | Bednarek |
| 7,031,449 | B1 | 4/2006 | Lundy et al. |
| 7,050,565 | B2 | 5/2006 | Sylvain |
| 7,110,525 | B1 * | 9/2006 | Heller et al. ............. 379/265.11 |
| 7,526,079 | B2 | 4/2009 | Mello |
| 7,720,737 | B2 | 5/2010 | D'Alessandro |
| 2001/0056349 | A1 | 12/2001 | ST. John |
| 2002/0002460 | A1 | 1/2002 | Pertrushin |
| 2002/0002464 | A1 | 1/2002 | Pertrushin |
| 2002/0010587 | A1 | 1/2002 | Pertrushin |
| 2002/0032591 | A1 | 3/2002 | Mahaffy et al. |
| 2002/0118816 | A1 | 8/2002 | Flockhart et al. |
| 2002/0181692 | A1 | 12/2002 | Flockhart et al. |
| 2002/0194002 | A1 | 12/2002 | Petrushin |
| 2003/0123642 | A1 | 7/2003 | Alvarado et al. |
| 2003/0152212 | A1 | 8/2003 | Burok et al. |
| 2003/0174830 | A1 | 9/2003 | Boyer et al. |
| 2003/0177017 | A1 | 9/2003 | Boyer et al. |
| 2003/0177231 | A1 | 9/2003 | Flockhart et al. |
| 2004/0057569 | A1 | 3/2004 | Busey et al. |
| 2004/0203878 | A1 | 10/2004 | Thomson |
| 2006/0182252 | A1 | 8/2006 | Harris et al. |
| 2006/0262921 | A1 | 11/2006 | Eppel et al. |
| 2008/0175372 | A1 | 7/2008 | Brunet et al. |
| 2009/0187455 | A1 | 7/2009 | Fernandes et al. |

FOREIGN PATENT DOCUMENTS

| | | |
|---|---|---|
| CA | 2174762 | 6/1995 |
| EP | 0 501 189 A2 | 9/1992 |
| EP | 0 740 450 A2 | 10/1996 |
| EP | 0 772 335 A2 | 5/1997 |
| EP | 0 855 826 A2 | 7/1998 |
| EP | 0 863 651 A2 | 9/1998 |
| EP | 0829996 A2 | 9/1998 |
| EP | 0866407 A1 | 9/1998 |
| EP | 899673 A2 | 3/1999 |
| EP | 998108 A1 | 5/2000 |
| EP | 1091307 A2 | 4/2001 |
| EP | 1150236 | 10/2001 |
| GB | 2 273 418 | 6/1994 |
| GB | 2 290 192 A | 12/1995 |
| WO | WO 96/07141 | 3/1996 |
| WO | WO 97/28635 | 8/1997 |
| WO | PCT/SE98/01074 | 12/1998 |
| WO | WO 98/56207 | 12/1998 |

OTHER PUBLICATIONS

U.S. Appl. No. 11/344,733, filed Jan. 31, 2006, Kalavar.
U.S. Appl. No. 11/243,435, filed Oct. 3, 2005, Kalavar.
GEOTEL Communications Corporation Web site printout entitled "Intelligent CallRouter" Optimizing the Interaction Between Customers and Answering Resources. 6 pages.
U.S. Appl. No. 09/235,065, Denton et al.
U.S. Appl. No. 09/247,893, Edwards et al.
U.S. Appl. No. 09/264,497, Edwards.
U.S. Appl. No. 09/756,955, Flockhart et al.
U.S. Appl. No. 09/420,912, Ford.
U.S. Appl. No. 09/416,737, Flockhart et al.
U.S. Appl. No. 10/098,824, Flockhart et al.
U.S. Appl. No. 10/673,118, Flockhart et al.
U.S. Appl. No. 10/673,115, Flockhart et al.
U.S. Appl. No. 10/673,103, Flockhart et al.
U.S. Appl. No. 10/673,105, Flockhart et al.
U.S. Appl. No. 10/683,039, Flockhart et al.
U.S. Appl. No. 10/099,144, Boyer et al.
U.S. Appl. No. 10/815,534, Flockhart et al.
U.S. Appl. No. 10/815,566, Kiefhaber et al.
U.S. Appl. No. 10/815,584, Kiefhaber et al.
U.S. Appl. No. 10/861,193, Flockhart et al.
U.S. Appl. No. 10/891,346, Flockhart et al.
U.S. Appl. No. 10/946,638, Flockhart et al.
U.S. Appl. No. 10/000,686, Flockhart et al.
"Product Features," *Guide to Call Center Automation*, Brock Control Systems, Inc., Activity Managers Series™, Section 5—Company B120, p. 59, 1992.
"Product Features," *Guide to Call Center Automation*, CRC Information Systems, Inc., Tel-ATHENA, Section 5—Company C520, p. 95, 1992.
Dawson, "NPRI's Powerguide, Software Overview" *Call Center Magazine* (Jun. 1993), p. 85.
"Applications, NPRI's Predictive Dialing Package," *Computer Technology* (Fall 1993), p. 86.
"Call Center Software You Can't Outgrow," *Telemarketing®* (Jul. 1993), p. 105.
"VAST™, Voicelink Application Software for Teleservicing®," *System Manager User's Guide*, Digital Systems (1994), pp. ii, vii-ix, 1-2, 2-41 through 2-77.
GEOTEL Communications Corporation Web site printout entitled "Intelligent CallRouter Call Flow", 1998.
GEOTEL Communications Corporation Web site Printout entitled "The Intelligent CallRouter Product Overview", Jul. 3, 1997.
GEOTEL Communications Corporation Web site printout entitled "Intelligent CallRouter Product Architecture" Jul. 3, 1997.
L.F. Lamel and J.L. Gauvain, Language Identification Using Phone-Based Acoustic Likelihood, ICASSP-94, 4 pages, Apr. 1994.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz 16 pages.
Presentation by Victor Zue, The MIT Ox90ygen Project, MIT Laboratory for Computer Science (Apr. 25-26, 2000) 9 pages.
MIT Project Oxygen, Pervasive, Human-Centered Computing (MIT Laboratory for Computer Science) (Jun. 2000) pp. 1-15.
Examiner's Refusal Decision dated Jul. 4, 2005 in Japanese Patent App. No. 2000-34266.
Examiner's Refusal Decision for Japanese Patent Application No. 2000-34267 dated Mar. 9, 2005 with translation, 4 pages.
Avaya, Inc. Business Advocate Product Summary, at http://www.avaya.com, downloaded on Feb. 15, 2003, Avaya, Inc. 2003, 3 pages.
Avaya, Inc. Business Advocate Options, at http://www.avaya.com, downloaded on Feb. 15, 2003, Avaya, Inc. 2003.
Avaya, Inc. CentreVu Advocate, Release 9, User Guide, Dec. 2000.
"Internet Protocol Addressing," available at http://samspade.org/d/ipdns.html, downloaded Mar. 31, 2003, 4 pages.
"Domain Name Services," available at http://www.pism.com/chapt09/chapt09.html, downloaded Mar. 31, 2003, 21 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Coles, Scott, "A Guide for Ensuring Service Quality In IP Voice Networks," Avaya, Inc., 2002, pp. 1-17.
Avaya, Inc., "The Advantages of Load Balancing in the Multi-Call Center Enterprise," Avaya, Inc., 2002, 14 pages.
Foster, Robin, et al., "Avaya Business Advocate and its Relationship to Multi-Site Load Balancing Applications," Avaya, Inc., Mar. 2002, 14 pages.
Chavez, David, et al., "Avaya MultiVantage Software: Adapting Proven Call Processing for the Transition to Converged IP Networks," Avaya, Inc., Aug. 2002.

Avaya, Inc., "Voice Over IP Via Virtual Private Networks: An Overview," Avaya, Inc., Feb. 2001, 9 pages.

Avaya, Inc., "Better Implementation of IP in Large Networks," Avaya, Inc. 2002, 14 pages.

*CentreVu Advocate Release 9 User Guide*, Avaya Inc., 585-215-953, Issue 1 (Dec. 2000), pp. 1-210.

"The Advantages of Load Balancing in the Multi-Call Center Enterprise," Avaya Inc. White Paper (Feb. 2002), pp. 1-13.

"Voice Over IP Via Virtual Private Networks: An Overview," Avaya Inc. White Paper (Feb. 2001), pp. 1-8.

"Better Implementation of IP in Large Networks," Avaya Inc. Application Note (Apr. 19, 2002), pp. 1-14.

"Internet Protocol Addressing," available at http://samspade.org/d/ipdns.html, downloaded Mar. 31, 2003, 9 pages.

David Chavez et al., "Avaya MultiVantage Software: Adapting Proven Call Processing for the Transition to Converged IP Networks," Avaya Inc. White Paper (Aug. 2002), pp. 1-18.

Doo-Hyun Kim et al. "Collaborative Multimedia Middleware Architecture and Advanced Internet Call Center," Proceedings at the International Conference on Information Networking (Jan. 31, 2001), pp. 246-250.

"When Talk Isn't Cheap," *Sm@rt Reseller*, v. 3, n. 13 (Apr. 3, 2000), p. 50.

"eGain's Commerce 2000 Platform Sets New Standard for eCommerce Customer Communications," *Business Wire* (Nov. 15, 1999)., 3 pages.

Douglas W. Stevenson et al., "Name Resolution in Network and Systems Management Environments," available at http://netman.cit.buffalo.edu/Doc/DStevenson/NR-NMSE.html, downloaded Mar. 31, 2003, 16 pages.

* cited by examiner

WORK ITEM RELATION AWARENESS FOR AGENTS DURING ROUTING ENGINE DRIVEN SUB-OPTIMAL WORK ASSIGNMENTS

CROSS REFERENCE TO RELATED APPLICATION

Cross reference is made to U.S. patent application Ser. No. 11/243,437, filed Oct. 3, 2005, entitled "Agent Driven Media-Agnostic Work Item Grouping and Sharing Over a Consult Medium", which is incorporated herein by this reference. Cross reference is also made to U.S. patent application Ser. No. 11/243,435, filed Oct. 3, 2005, entitled "Agent Driven Work Item Awareness for Tuning Routing Engine Work-Assignment Algorithms", which is also incorporated herein by this reference.

FIELD

The invention relates generally to servicing interactions in a contact center and specifically to enhancing the efficiency with which contacts are handled.

BACKGROUND

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria.

Contact centers are typically designed to service contacts as efficiently as possible. Many different routing and queuing algorithms exist that attempt to increase the accuracy and speed with which contacts are handled. For example, different algorithms exist for different contact media types. When a customer sends in an email with a question to a contact center, they are not always concerned with receiving immediate feedback. In contrast, when a customer calls into a contact center with a question they almost certainly do not want to wait for days to be attended to. The rules regarding how these two different media types are handled vary significantly. When a call comes into a call center, the amount of time a call has waited may be the most important parameter that determines where that contact is sent. However, when an email comes into a contact center, the matching of agent skills with contact requirements may be the most important parameter and the amount of time that contact sits in the queue is not as high a priority. Even though routing of the contact is usually left up to the contact center algorithms, the responsibility of the interaction and handling of the contact is up to the agent.

Typically, when a contact is received in a contact center, an IVR, human agent, or some other resource collects information pertinent to the contact. This information may include, the name of person initiating the contact, where they are located, what the contact generally relates to, and any other relatively easy to determine parameters. The server takes the information and populates an information field corresponding to that contact.

The workflow routing engine directs contacts to various agents based on algorithms and predetermined criteria as described above. Normally predetermined criteria include limits on expected, predicted, and/or actual call wait time for one or more selected sets or queues of customer contacts, limits on the number of idle agents, limits on customer queue lengths, and various other limits and policies that must be set according to some management decisions. Such limits and policies are typically defined by contact center management in a Service Level Agreement or SLA. Once the contact center is programmed it is forced to work within the constraints set down by the contact center manager or operator.

The workflow engine often identifies, or is able to identify, an optimal agent for a given contact based on a combination of agent skills, contactor identity, contactor revenue history, the contactor's customer class membership (e.g., gold, silver, or bronze), and contact needs and/or requirements without regard to other policy considerations, such as customer expected, predicted, or actual wait time, etc. Often, policy limits for a set of customers, such as a customer queue, are exceeded. For example, a queue may be experiencing expected, predicted, and/or actual wait times in excess of policy limit(s). At this point the workflow routing engine has no alternative but to route the contact to a suboptimal agent. As used herein, an "optimal agent" refers to an agent that would be selected by the workflow engine to service a selected customer and corresponding customer in the absence of a contact center policy limit and/or without regard to agent availability, and "suboptimal agent" to an agent that is not considered to be an optimal agent for the selected contact and corresponding customer. Depending on whether the contact is real time or not real time, an "optimal agent" may be on or off shift at the time the workflow engine makes the agent routing decision. A suboptimal agent may only have a subset of the necessary skills required to handle the given contact. Alternatively, this agent may not be as proficient at handling this type of contact, but given enough time the contact will be serviced properly. Whatever the situation is, the agent who is selected to assign to the current contact is not the best (optimal) one in the contact center to handle the contact. The workflow engine often knows that it made a suboptimal routing decision, unlike the agent who has no idea he was the next best choice. This type of situation arises in contact centers on a daily, even hourly, basis and is an inherent source of contact center inefficiency and customer dissatisfaction.

A number of examples illustrate the distinction between optimal and suboptimal agents.

In a first example, a contact enters a contact center by a phone call. The workflow routing engine determines that Agent A is the best or optimal agent to handle this particular contact because he is the highest skilled agent then on shift regarding the customer needs identified for the contact by the Interactive Voice Response or IVR unit. However, Agent A is not available to service the phone call currently because he is working on another contact from a different customer having the same customer needs. Because the optimal Agent A is unavailable to service the call, the call is routed to the next agent, Agent B. Agent B proceeds to handle the call and after a certain amount of time finishes that call. However, Agent A may have been able to handle both calls at the same time because they were directed to the same customer needs. The contact center has just experienced a drop in efficiency and/or customer satisfaction without anyone ever knowing it.

In a second example, Agent A is only enabled for email and she receives a contact. Agent A begins working on the given contact and continues to go about her business. However, after a period of time has lapsed, the customer who initiated the original contact by email wants an immediate answer and calls the contact center. Now there exist two contacts that were initiated by the same customer and are related to the same subject matter. The problem is that Agent A is not enabled to handle voice so the second contact is routed by the workflow routing engine to Agent B. The routing engine knows that both of these contacts are from the same person and are directed to the same subject matter, but does not tell anyone. So Agent B receives the voice contact and goes about helping the customer in the normal course. Now there are two agents in the contact center servicing the same subject matter from the same customer and neither one of them are aware of it. Apart from the danger of inconsistent responses being provided to the customer, the contact center is operating in a very inefficient manner without anyone knowing about it.

In a third example having the same facts as the second example, agent A is enabled for voice calls but is servicing another voice call. The engine initially decides to route the voice contact to agent A; however, after about 30 minutes of waiting, routes the voice contact to agent B due to SLA requirements. The waiting customer may have been willing to wait for Agent A to become available had the customer known that Agent A would provide better service.

In both of the examples, the workflow routing engine is aware of the relation between the contacts but is unable to route the contacts to a common agent due to other parameters it had to consider. In neither of these examples is the customer data provided to Agents A and B particularly helpful in identifying the inefficiency. The customer data is mostly historical and fails to provide any insight to the ongoing interactions that may currently be active in the contact center.

SUMMARY

In one embodiment, the present invention is directed to a method for servicing contacts that includes the steps:
 (a) receiving a first contact from a first customer;
 (b) selecting a first agent to service the first contact and delivering the first contact to the first agent, the first agent being a suboptimal selection for servicing the first contact and a second agent being an optimal selection for servicing the first contact; and
 (c) performing at least one of the following steps:
  (c1) notifying the first agent that the second agent was the optimal selection for servicing the contact; and
  (c2) after delivery of the first contact to the first agent, notifying the second agent that the first agent is the suboptimal selection for servicing the contact and that the second agent is the optimal selection for servicing the contact.

The embodiment can allow the first agent to have a contextual awareness of other active interactions in the system that are currently being serviced by other agents, such as the second agent, or in another queue and that are related to the first contact. While the selector or workflow routing engine may not be able to route the first contact appropriately at that instant in time, it allows the first agent to make a determination of the best way to handle the interaction once assigned. In one configuration, the engine generates awareness pointers to other related contacts during assignment that provides the first agent with a full contextual view to the assigned first contact and other related contacts, even if the interactions are across different media or business processes and assigned to different agents or queues.

In another embodiment, the first customer is notified that the first agent is the suboptimal selection and is currently available to service the first contact and that a second agent is the optimal selection and will be available to service the first contact after an additional waiting period. The customer may then select whether to have immediate servicing by the less optimal first agent or delayed servicing by the optimal second agent.

The present invention can have a number of advantages over the prior art. For example, an agent can have the ability to make a determination on whether he is the right person to handle a contact based on the workflow routing engine specified awareness he has of related active contacts that may be assigned or waiting to be assigned to other agents. This can be a very powerful tool to prevent duplication of work. The agent no longer needs to work blindly on assigned interactions. The invention can also improve contact handling times by allowing agents the insight that may allow him to prevent duplication by transferring work to the other agent who may have already completed a substantial part of the task while working on the same issue but on another media channel. Unlike the prior art, the present invention does not assume that the routing engine provides always the best or optimal routing decision. Accordingly, the present invention can provide, relative to conventional contact centers, substantial improvements in agent efficiency and customer satisfaction levels and reductions in contact center operating costs.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide additional intelligence from a controller to agents to improve contact processing.

Figure 1:
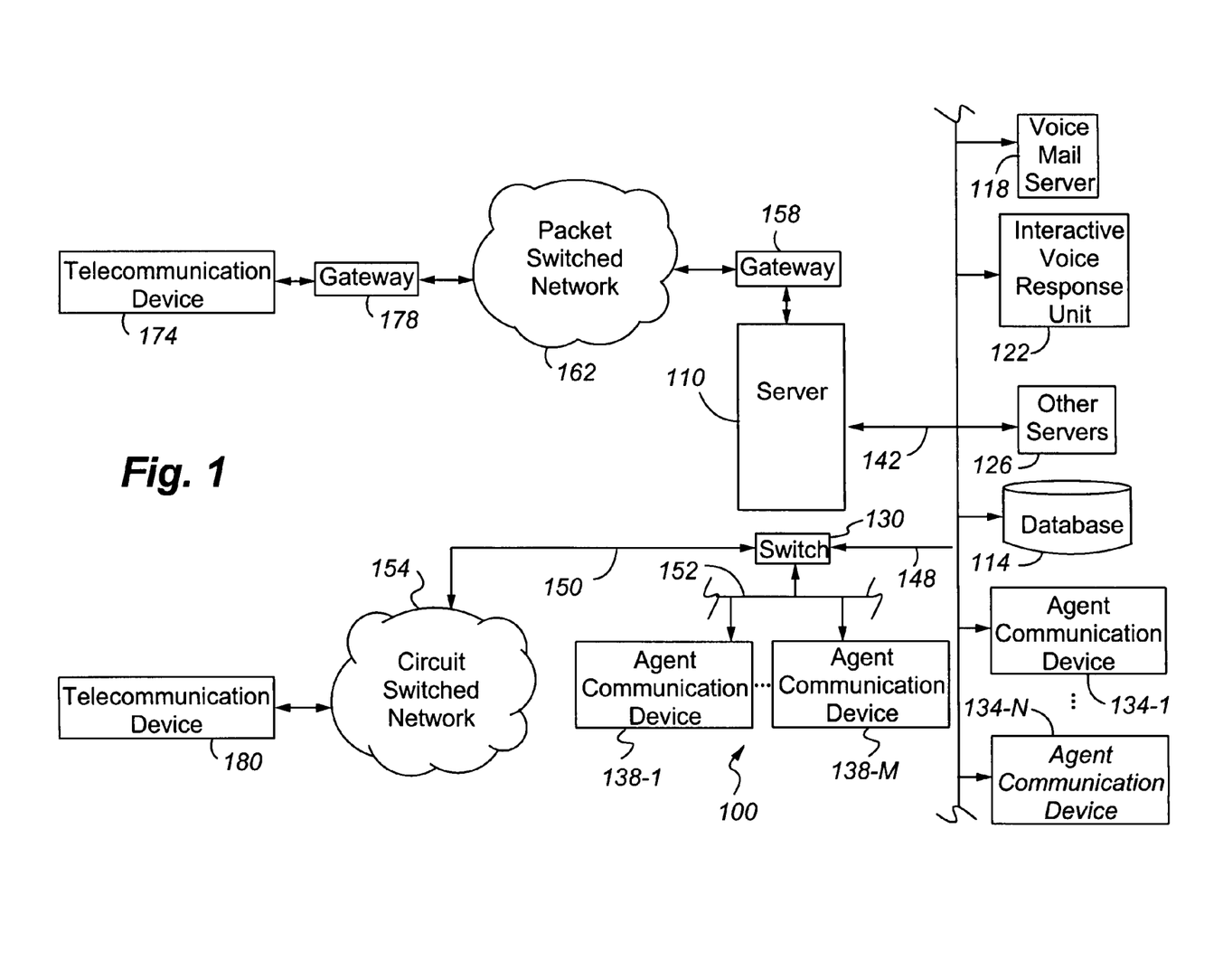
FIG. 1 is a block diagram depicting a contact center in accordance with an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact, and a plurality of servers, namely a voice mail server 118, an Interactive Voice Response unit or IVR 122, and other servers 126, a switch 130, a plurality of working agents (not shown) operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 148 to the switch 130. As will be appreciated, the other servers 126 can also include a scanner (which is normally not connected to the switch 130 or Web server), VoIP software, video contact software, voice messaging software, an IP voice server, a fax server, a web server, and an email server, SMTP and POP3 servers for relaying and receiving emails respectively, chat server to host chat sessions, instant messaging gateways, SMS/MMS gateways for receiving SMS/MMS messages through a mobile device, context analysis appliances, autoresponders, VoIP gateways, and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc.

Referring to FIG. 1, the gateway 158 can be any suitable gateway device, such as Avaya Inc.'s, G700™, G600™, MCC/SCC™ media gateways and may be implemented as hardware such as via an adjunct processor (as shown) or as a chip in the server.

The first telecommunication devices 134-1 . . . 134-N are packet-switched and can include, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1 . . . 138-M are circuit-switched. Each of the telecommunication devices 138-1 . . . 138-M corresponds to one of a set of internal extensions. The switch/server can direct incoming contacts to and receive outgoing contacts from these extensions in a conventional manner. The second telecommunication devices can include, for example, wired and wireless telephones, PDAs, H.320 video phones and conferencing units, voice messaging and response units, and traditional computer telephony adjuncts.

It should be noted that the invention does not require any particular type of information transport medium between switch or server and first and second telecommunication devices, i.e., the invention may be implemented with any desired type of transport medium as well as combinations of different types of transport media.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first telecommunication device 174 via a gateway 178, and the circuit-switched network 154 with an external second telecommunication device 180. These telecommunication devices are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

Figure 2:
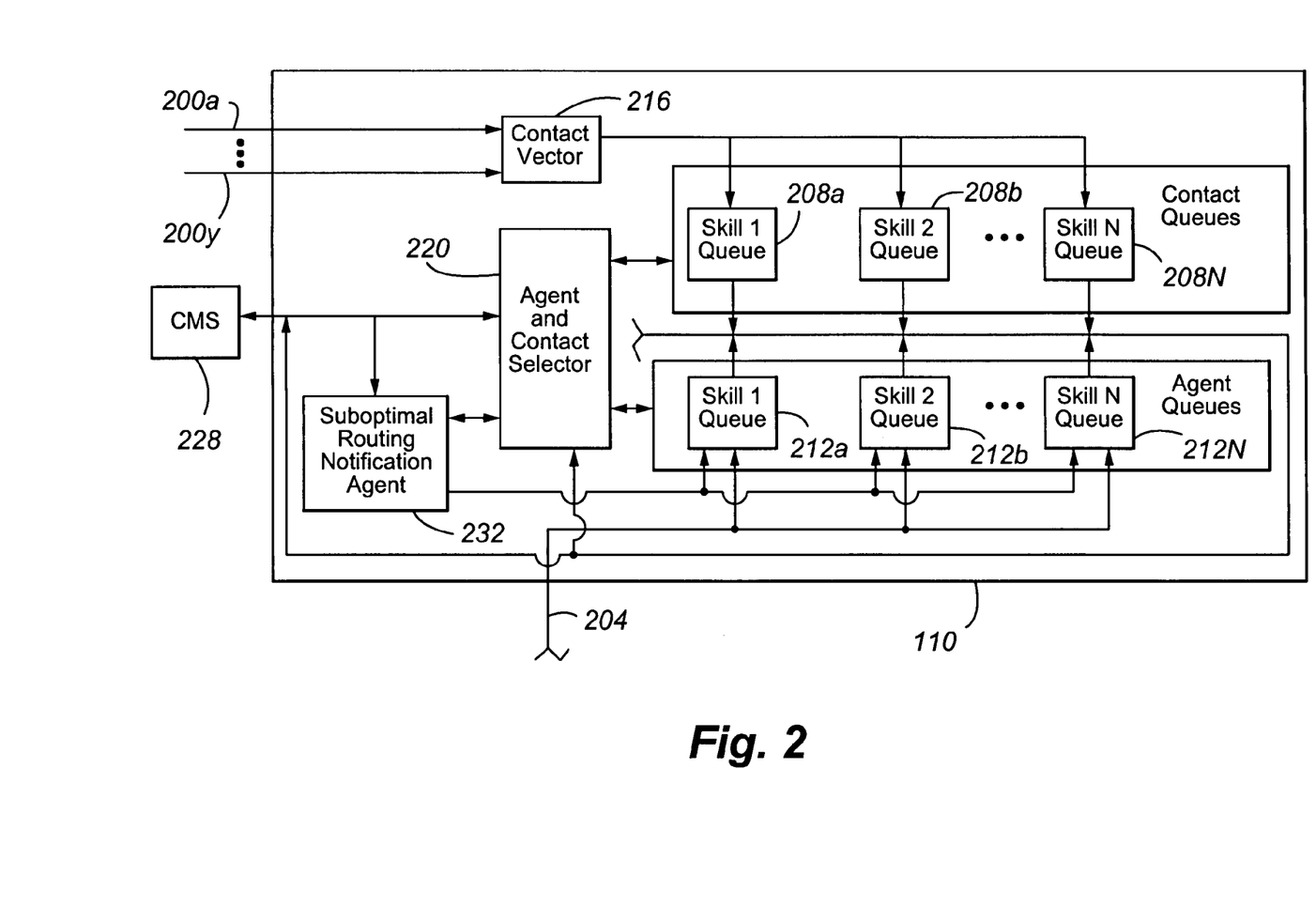
FIG. 2 is a block diagram depicting a server in accordance with another embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include a Basic Call Management System™ or BCMS 224 and a Call Management System™ or CMS 228 that gathers call records and contact-center statistics for use in generating contact-center reports.

Included among the data stored in the server 110 are a set of contact queues 208a-n and a separate set of agent queues 212a-n. Each contact queue 208a-n corresponds to a different set of agent skills, as does each agent queue 212a-n. Conventionally, contacts are prioritized and either are enqueued in individual ones of the contact queues 208a-n in their order of priority or are enqueued in different ones of a plurality of contact queues that correspond to a different priority. Contacts in a common queue need not be of the same media type. For example, one contact queue could contain VoIP calls, telephone calls, emails, and chats. Furthermore, a single contact could be a physical representation of a grouping of different media types, e.g., one contact may be a grouping of emails and calls from a similar customer or even from different customers related to the same subject matter. Likewise, each agent's skills are prioritized according to his or her level of expertise in that skill, and either agents are enqueued in individual one of agent queues 212a-n in their order of expertise level or are enqueued in different ones of a plurality of agent queues 212a-n that correspond to a skill and each one of which corresponds to a different expertise level. Included among the control programs in the server 110 is a contact vector 216. Contacts incoming to the contact center are assigned by contact vector 216 to different contact queues 208a-n based upon a number of predetermined criteria, including customer identity, customer needs, contact center needs, current contact center queue lengths, contact media type, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n at simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Additionally, agents can be non-human contact handling media. For instance, a recording device may be the "agent" that a contact is directed to as an intermediate step to assigning a human agent to processing the contact. The definition of agent need not be limited to human contact servicing agents.

Also included in one embodiment of the present invention is a suboptimal routing notification agent 232. The suboptimal routing notification agent 232 is operable to receive contact routing information from the agent and contact selector 220 and, when suboptimal routing decisions are made by the agent and contact selector 220 for some reason, the suboptimal routing notification agent 232 receives that information and updates the contact information in the Electronic Data Unit or "EDU" as used hereinafter to reflect suboptimal routing information. In essence, attributes within this data-structure provide a complete view of an incoming contact. The EDU representation is how the information flows within the contact center system throughout the life cycle of the contact. The EDU may also contain information relating to the last contact that was initiated by the same person to assist the agent in handling this particular contact more effectively. The workflow routing engine then directs the contact to an agent according to predefined algorithms using some or all of the information contained in the EDU. When an agent finally receives the contact, the information in the EDU is displayed to the agent to help them service the contact. The suboptimal routing information can include information, such as a suboptimal routing indicator (which is a flag that is set/unset depending on whether the routing decision was optimal or suboptimal), an optimal agent identifier of the optimal agent selected for the subject contact/customer, optimal agent selection code(s) setting forth the reason(s) why the optimal agent was selected, and/or suboptimal agent selection code(s) setting forth why the suboptimal agent (to which the contact is delivered) was selected. By including the suboptimal routing information in the EDU associated with the selected contact, the suboptimal routing notification agent 232 notifies agents in the agent queues 212a-n that a suboptimal routing decision has been made and why. In another configuration, the EDU may contain pointers to the other EDUs representing active contacts assigned to some other agent where the contacts are related.

In one configuration, when a contact is routed to an agent other than the optimal agent, the suboptimal routing notification agent 232 notifies not only the assigned (suboptimal) agent but also the unassigned optimal agent that a suboptimal routing occurred involving both of the agents and why it occurred. The identification in the associated EDU of the identity of the optimal agent may allow the assigned agent to contact the optimal agent directly (e.g., in an agent-to-agent contact) other than through the routing engine. For example, if the optimal agent was only available for voice but the contact was a chat, the assigned (suboptimal) agent could call the optimal agent and ask him to receive the chat followed by a transfer of the contact. If the optimal agent was available for voice but was unavailable when the routing decision was made by the engine, the suboptimal agent could forcibly transfer the voice contact to the optimal agent. If the optimal agent is unavailable, the suboptimal agent could commence servicing the contact, and the workflow routing engine could alert the suboptimal agent when the optimal agent becomes available provided that the contact is still being serviced. In that event, the EDU would contain some portion of the information received by the suboptimal agent from the customer or otherwise exchanged between the suboptimal agent and customer for later delivery to the optimal agent if the contact is transferred. The suboptimal agent could even walk down the hallway and talk face-to-face with the optimal agent. Likewise, the suboptimal routing notification agent 232 may tell the optimal agent who the assigned agent is. The suboptimal agent may also ask the customer if he is willing to wait longer for the optimal agent and provide him with the reason(s) why the other agent is optimal for servicing his contact. In this event, if the customer chooses to wait longer the suboptimal agent notifies the routing engine, which returns the contact to the queue or holds the contact for assignment to the optimal agent when she becomes available. The notification would effectively "toll" the existence of a wait time in excess of SLA requirements. By pushing down routing information to the agents, the suboptimal routing notification agent 232 has empowered both agents to collectively handle the contact in a more efficient manner. The suboptimal routing notification agent 232 does this by updating the contact information whenever a suboptimal routing occurs.

Information updates relating to a particular contact can be stored in an EDU as was mentioned above. The EDU container is where contact information is stored in the database 114. Pointers in the database 114 connect a given contact to its respective EDU. The EDU may contain contact information that was gleaned when the contact was initiated for instance by an IVR or some other information retrieval mechanism. The EDU may also contain information relating to a previous contact that was initiated by the same person or organization. All of the information inside the EDU is meant to assist the agent in handling any given contact. Every EDU has a unique identifier, the EDUID. This identifier can be used to retrieve a particular EDU. As long as the EDU is available, services within the contact center that have access to this EDU at a given point in time also have access to attributes within the EDU. Attributes within the EDU may be added, changed, or removed by the suboptimal routing notification agent 232 or any agent in the contact center.

The EDU can be viewed as a container of attributes in accordance with one embodiment of the present invention. By judicious use of attribute identifiers, one can define sub-containers within the EDU that contain attributes associated with a particular function. For example, the attribute "media" could be a simple accessor for the work item's media type. There could be sub-containers within any given attribute, for instance "email.header" would have "email" as the container within the EDU, and "email.header" would be a sub-container within the "email" container. The true attribute identifier may exist in any one of these containers or sub-containers and they would allow the agents and server to access the information of any given contact. As a continuation of the above example, the true attribute identifier for the email's content type may be in the sub-container "email.header.contenttype". While this type of container based (nested) functional grouping of attributes is not necessary, it allows for a logical categorization of attributes, which can be useful. The term "container" refers to one or more logical categorizations in the EDU.

In one configuration, the server 110, through the suboptimal routing notification agent 232, generates awareness pointers in a first EDU associated with a first contact. The pointers point to other related interactions (as determined by the workflow routing engine using often complex workflow scripts or algorithms) during assignment. The pointers provide the agent to whom the first contact is delivered a full contextual view to the assigned interaction and other related interactions, even if the interactions are across different media or business processes and assigned to different agents or queues. Contacts are "related" when they involve the same customer and/or similar or the same subject matter, even though are on different channels of the same media type or over different media types. For example, an email and voice contact currently enqueued for the same customer are "related". Likewise, two currently enqueued voice contacts directed to the same technical question are "related". The contextual view could be provided to the suboptimal agent regarding the interaction between the optimal agent and the customer on the related contact and/or vice versa.

In this configuration, the contextual view of the related interactions could be of a variety of different forms. For example, a full recording, transmission, and/or transcript of the interaction of the related contact could be provided to the agent servicing the other one of the related contacts. The recording, transmission, and/or transcript could be historical and/or real time. The contextual view could include electronic message attachments, fax contents, email contents, chat transcripts, Instant messaging session transcripts, SMS message exchange transcripts, and the like.

Figure 3:
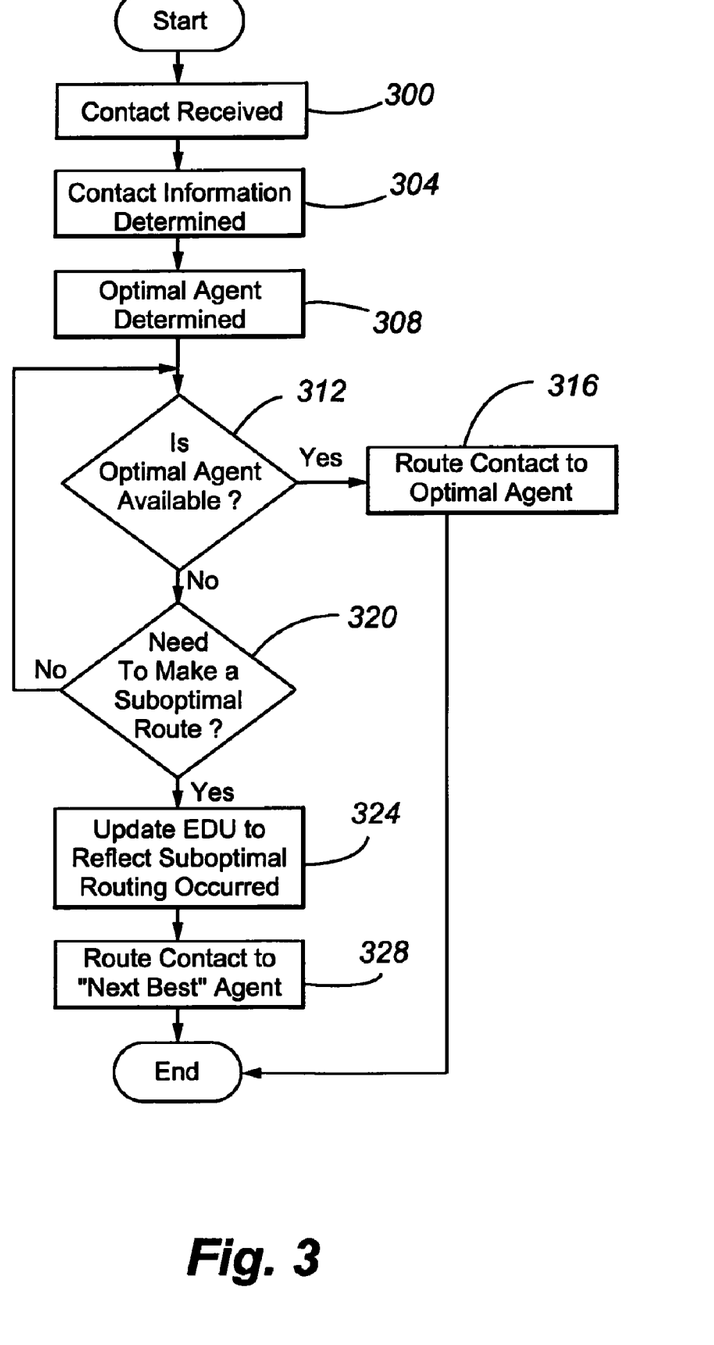
FIG. 3 is a flow chart depicting movement of contacts in a contact center according to a further embodiment of the present invention.

Referring now to FIG. 3 the movement of a call will be described according to one embodiment of the present invention.

In step 300, a contact is received in a contact center. The contact can be in the form of at least one of a phone call, a VoIP call, a chat, an email, a fax, a video call, an SMS/MMS message, instant message, etc.

In step 304 the contact information is determined. When a contact is received, the customer is identified by known techniques including an information retrieval agent, by Dialed Number Identification Service (DNIS) digit collection and analysis, originating email address, chat session user Id, computer IP address, SIP identifier, voice recognition, or any other contact identification system. Additional customer information can be collected if needed. Customer information can be solicited, such as by an agent employed by the central enterprise network 100, the IVR 122, workflow block, or other techniques known to those of ordinary skill in the art. Examples of customer information include product or service interest requirements, customer location, level of assistance needed, timing constraints, priority level of the contact, customer presence information, personal customer information, and historical business information relating to the customer or organization. The customer information is stored in the database 114 for later use for instance in containers in the EDU. Likewise, the database 114 contains agent-specific information for each agent available. The contact is then placed in a customer queue 208 to wait for servicing by an agent in the corresponding agent queue 212.

In step 308, when a contact is at the head of the queue 208 an optimal agent for the given contact is determined by the agent and contact selector 220. The optimal agent is determined by criteria based algorithms that incorporate predetermined criteria including customer identity, customer needs, contact center needs, current contact center queue lengths, contact media type, customer value, and the agent skill that is required for the proper handling of the contact.

Once the optimal agent is determined in step 308, the server 110 determines if the optimal agent is "available" to take the given contact in step 312. This is determined primarily by the state in which the optimal agent is currently in. For example, the optimal agent may be in a busy or occupied state, meaning that he/she is currently handling another contact and is unavailable to handle the next contact. Also, the optimal agent may not be enabled for that given contact's media type currently. For example, the contact may be in the form of a chat but the agent can only handle voice and email contacts. If this is the case the contact is forced into a queue for that particular agent. However, if the optimal agent is in the available state the server 110 routes the contact to the optimal agent in step 316.

If the optimal agent is not currently "available" to service the contact, the selector 220 next determines whether there is a need to make a suboptimal route in decision diamond 320. There may be many reasons why the agent and contact selector 220 is unable to route the contact to the optimal agent. In addition to the optimal agent not being currently "available", the selector 220 may be unable to requeue the contact or hold the contact in queue until the optimal agent becomes available. Contact center limits/policies, such as set forth in an SLA, may prohibit requeuing or contact holding altogether or limit the amount of additional wait time that the contact may be requeued/held in queue. If the agent and contact selector 220 is forced to implement a suboptimal routing of the contact, the agent and contact selector 220 notifies the suboptimal routing notification agent 232.

The suboptimal routing notification agent 232 then updates the EDU with the suboptimal routing information. The suboptimal routing notification agent 232 may create a new container in the EDU just for the suboptimal routing information. Information like who the optimal agent is, who the assigned agent is, why the contact was sub optimally routed to the assigned agent, etc. is input into their respective fields in that suboptimal routing information container.

After the EDU has been updated in step 324, the server 110 routes the contact to the assigned (suboptimal) agent. Then the suboptimal routing notification agent 232 may notify one or both of the assigned agent and the optimal agent that a suboptimal routing occurred.

As can be appreciated, the optimal agent need not represent the single best-suited agent for a particular contact. The optimal agent may be a collection of equally skilled agents or may be a queue of optimal agents. Likewise, the assigned agent need not be the "next best" agent according to the assignment algorithms. After it is determined that the contact cannot be routed to the optimal agent, the server 110 may attempt to route the contact to who it has determined to be the "next best" agent. However, this agent (or collection of agents) may also be unavailable to handle the contact for whatever reason thereby forcing the server 110 to choose the "next best" agent. This process will repeat itself until a contact is routed to an available agent. The suboptimal routing notification agent 232 is given all or part of this information relating to the routing decision process and will in turn update the EDU with all or part of the routing information. Additionally, the suboptimal routing notification agent 232 may notify the selected agent and all or some of the previously selected agents. The amount of notification that occurs may vary depending on how much information is needed to help the agents make an informed decision regarding the processing of the contact.

Figure 4:
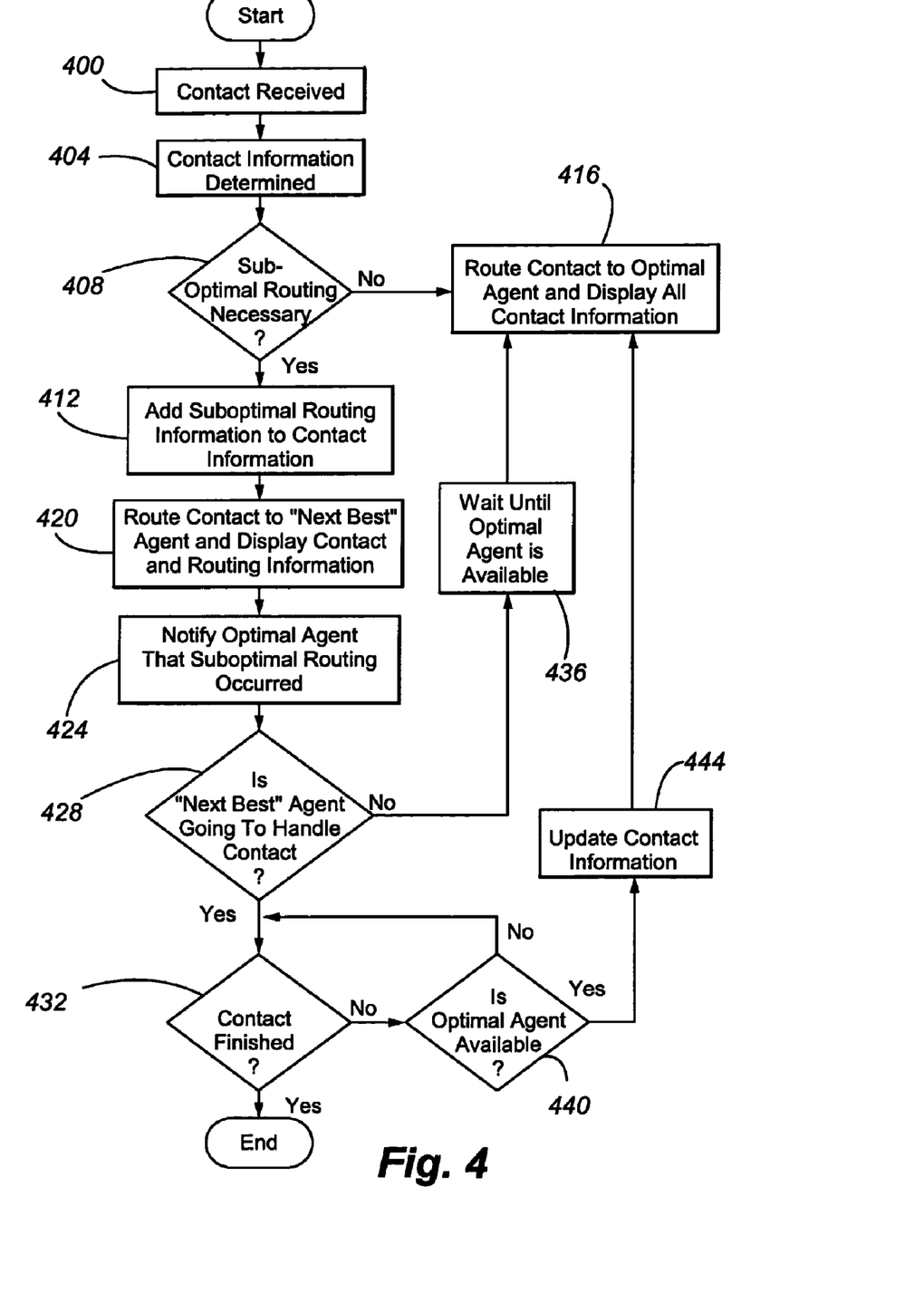
FIG. 4 is a flow chart depicting switch/server logic in accordance with an embodiment of the present invention.

With reference to FIG. 4 the logic of server 110 will now be discussed in accordance with an embodiment of the present invention.

The contact is received in step 400.

Thereafter, the contact information is determined in step 404 either by automatic or manual methods as discussed above and the contact queued.

In step 408, the agent and contact selector 220 determines if suboptimal routing is necessary. If so then the suboptimal routing information is sent to the suboptimal routing notification agent 232, which then updates the EDU with the routing information in step 412. In this configuration, whether or not the optimal agent is available is part of the suboptimal routing determination.

If suboptimal routing is not necessary, the server 110 connects the optimal agent with the given contact in step 416. When the agent receives the contact selected contact information is provided to the agent. Having the optimal agent available for a contact is typically not the case unfortunately and usually a suboptimal routing is necessary.

After the routing information has been updated in step 412, the agent and contact selector 220 attempts to find an available "next best" agent to handle the contact as describe above. Once an available "next best" agent is found, the server 110 connects the given contact to the assigned agent in step 420. Additionally, the contact information along with the suboptimal routing information is displayed to the assigned agent.

In step 424, the optimal agent is notified of the suboptimal routing and may also be provided with the contact information.

In step 428, it is determined whether or not the assigned agent will be handling the contact. This can be completed by an IVR query that asks the originator of the contact if he/she wants their contact handled by an agent other than the predetermined optimal agent. Alternatively, the assigned agent may ask the customer if they would like to continue holding for the optimal agent. If the originator of the contact wants to wait for the optimal agent, the contact is placed back into the queue for the optimal agent in step 436. This enables the originator of the contact to have a choice as to how their contact is served. Also, if the contact is put back into the queue for the optimal agent, it may be put in with exceptions to the normal routing rules. For example, when a predetermined criteria is exceeded the contact would not be forced to an alternative agent. The contact could remain in the optimal agent's queue until it is serviced.

However, the originator of the contact may not mind having the "next best" agent service the contact. If this is the case then the assigned agent begins to service the given contact. The assigned agent can work on the assigned contact until it is either completed or if it is determined that the optimal agent is available to handle the contact in steps 432 and 440. If the assigned agent completes a given contact then the contact is over. If it is determined that the optimal agent is available to take the contact while the assigned agent is servicing the contact in step 440 then the server 110 reroutes the contact back to the optimal agent.

The contact information is updated in step 444. In this step, the assigned agent can transfer the completed work to the optimal agent along with any other pertinent information that may be useful in handling the contact. Then the contact is routed to the optimal agent and the relevant information is displayed in step 416.

Figure 5:
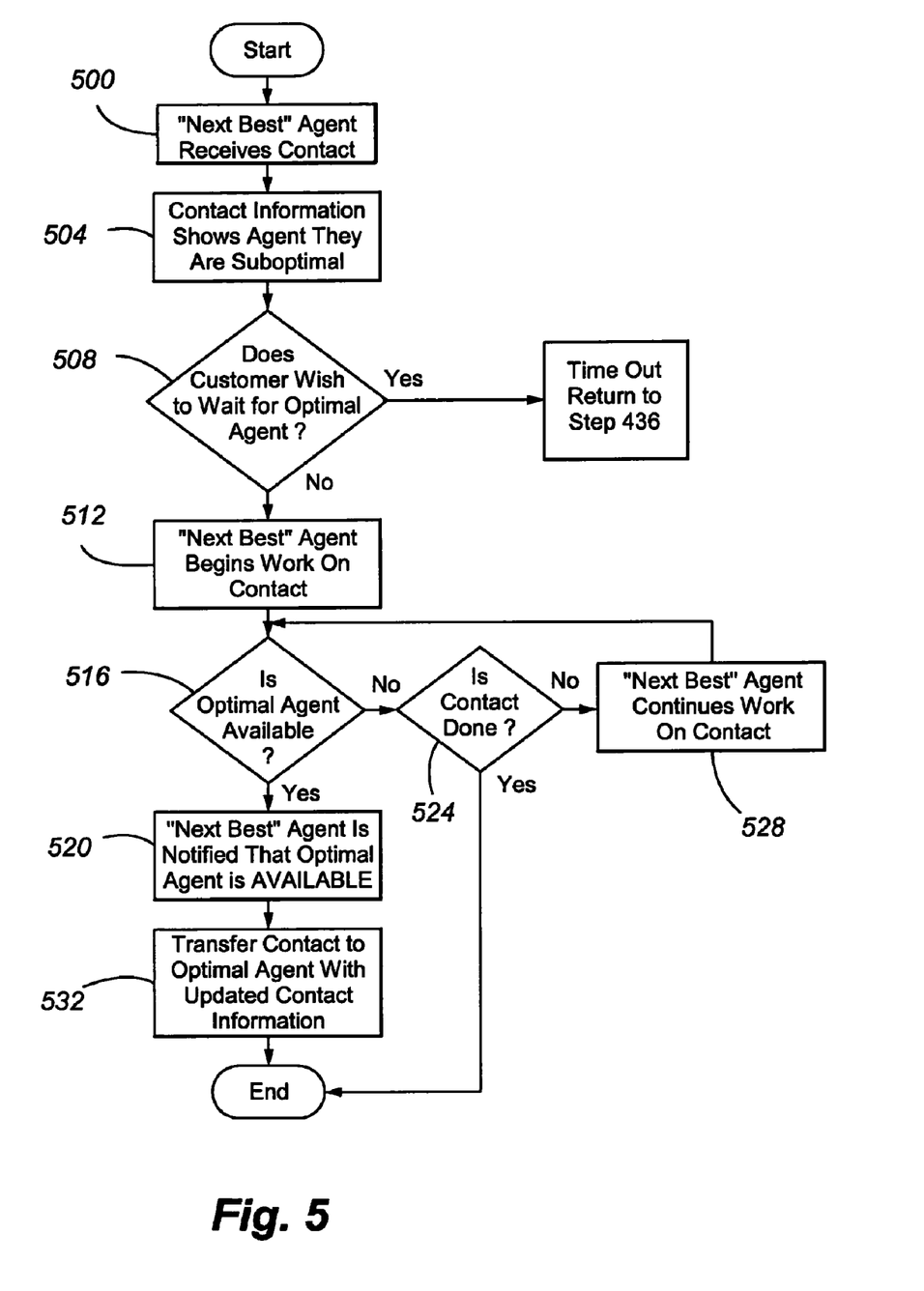
FIG. 5 is a flow chart depicting an operational embodiment of an agent according to an embodiment of the present invention.

Referring to FIG. 5, the flow diagram depicting decisions of an assigned agent are displayed in accordance with an embodiment of the present invention.

In step 500, the "next best" agent is assigned to a contact and receives that contact.

In step 504, the contact information displaying the suboptimal routing information is provided to the assigned agent.

In step 508, it is determined if the customer wishes to wait for the optimal agent. If so, then return to step 436. Otherwise, the assigned agent begins working on the contact in step 512.

In step 516 it is determined if the optimal agent is available yet. If so, the server 110 notifies the assigned agent that the optimal agent is available by either a visual or sound indicator. The server 110 may provide a message to the assigned agent on his/her workstation via an emergency email notification or their screen may simply have another window pop up identifying the availability of the optimal agent.

The assigned agent can then update the containers in the EDU with any information that was gleaned from servicing the contact. Additionally, the context of the interaction between the customer and the agent can be saved. For example, if the contact was in the format of a chat, then the subsequent interaction can be saved and put into another container in the EDU, however this information can also be formatted and saved if the contact came in any other format (i.e. phone call, VoIP, email, etc.). This information can be updated real-time or periodically. When anyone wants to view that contact information, including all of it's context, they only need to pull it from the contact EDU. This information can be reviewed real-time as well or can be reviewed after the fact. This type of contextual information is available to the optimal agent when the contact is transferred to him/her in step 532. Giving the updated contact information along with the context of the previous interactions allows the optimal agent to pick up right where the previously assigned agent left off, thereby decreasing the amount of work that is duplicated as a result of the transfer.

However, the optimal agent may not become immediately available in step 516 so the assigned agent works on the contact in step 528 until either the contact is done or the optimal agent finally becomes available.

Figure 6:
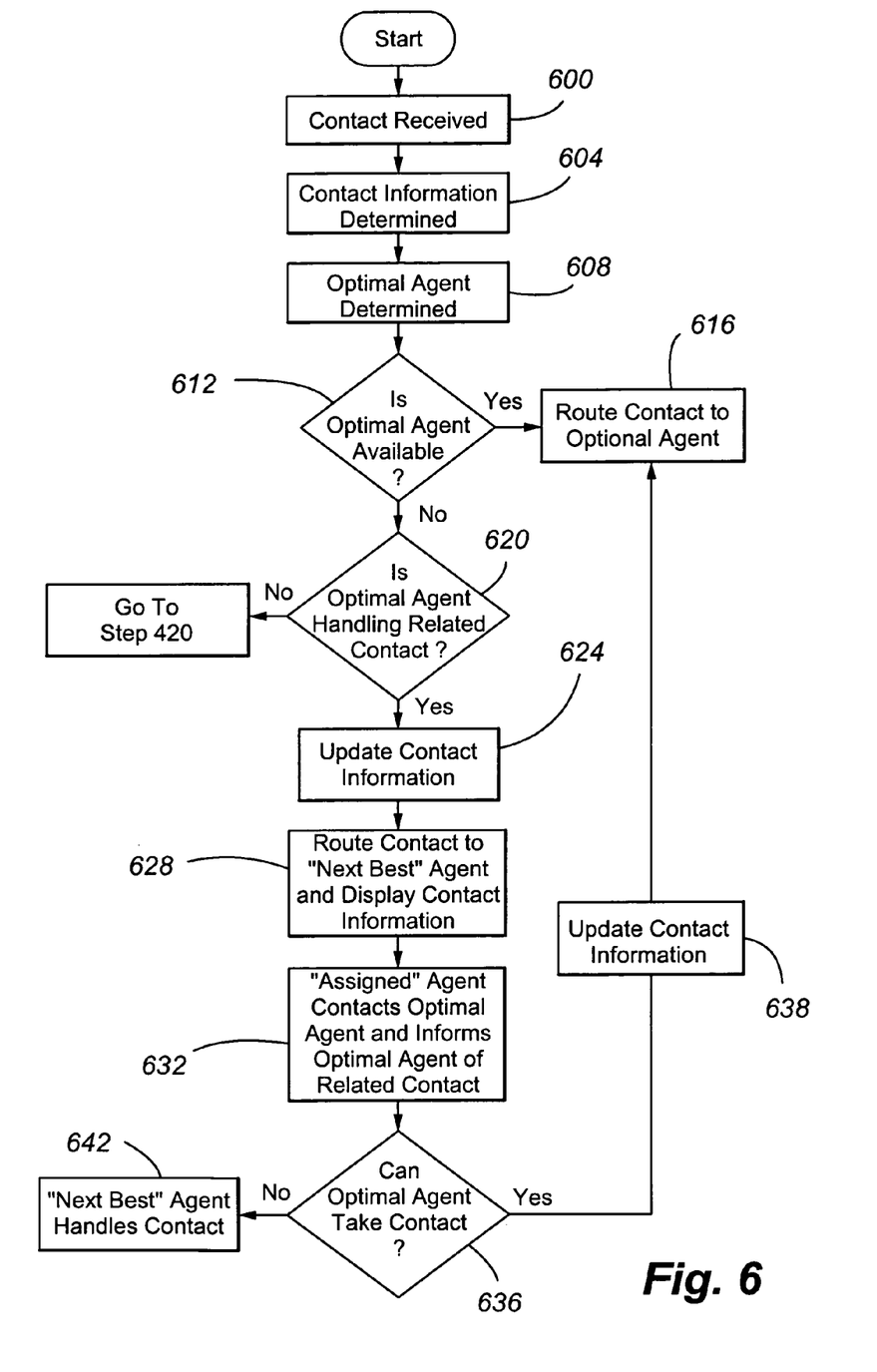
FIG. 6 is a flow chard depicting call movement and switch/server logic according to yet another embodiment of the present invention.

Referring now to FIG. 6, a flow chart depicting an alternative embodiment of the present invention will be discussed.

In step 600, a contact is received in a call center.

In step 604, initial contact information is determined and added to the information's respective containers in the EDU.

In step 608, the optimal agent is determined by the agent and contact selector 220.

In step 612, it is determined if the optimal agent is available. If so the contact is routed to the optimal agent in step 616. If not, it is determined if the optimal agent is handing a related contact in step 620. If not, then go to step 420 and route the contact to the "next best" agent and display information, including suboptimal routing information. However, there are ways of determining if the optimal agent is handling a related contact of either the same media or different media type. This determination can be made by the server 110 comparing the data in the various containers of the EDU of the given contact with the data in the various containers of the EDU of the contact the optimal agent is handling. For example, if the attribute identifier corresponding to the content type of each contact is the same then the server notes this and adds that information to the routing information container. Also, if the attribute identifier corresponding to the contact originator matches in both contacts and the content type matches then this information is added to the EDU. This could be the example where a customer has initiated a contact by email originally and that contact is being serviced by a first optimal agent. Then the customer initiates another contact by a phone call and that contact is routed to a second agent who may or may not have the same skill set as the first optimal agent. The server 110 is able to identify that the contacts are related not only in nature but also in their originators and it will add that information to a container in the EDU, possibly the routing information container. That way when the "next best" agent is assigned to that contact in step 628, the routing information relating to the contact and it's related contact are displayed to the assigned agent.

The assigned agent contacts the optimal agent who is handling the first contact and informs him/her of the multiple related contacts in step 632. In step 636 the optimal agent determines if they can handle both contacts. If so, the contact information is updated accordingly to display that both contact have been combined in step 638, then the contact is routed to the optimal agent in step 616. If the optimal agent chooses not to handle the second contact then the "next best" agent handles the contact in step 642. In this step the "next best" agent may simply delete/release the contact due to it's redundancy in the system. Alternatively, the "next best" agent may continue to service the contact if the situation warrants. Having the suboptimal routing notification agent push down routing information to the agents allows the agents to make better decisions on how to service a given contact, rather than just "blindly" working on a contact.

It will be appreciated that all routing information needs not be displayed to all of the agents. It may be desirable to supply all of the routing information to a particular agent and none to another agent. Moreover, if agents become overwhelmed with suboptimal routing information and notifications then the suboptimal routing information may be selectively sent to the agents. All of these decisions can vary depending on the application and type of contacts being serviced. Additionally, routing information may be supplied to selected agents only for a selected type of contact, for instance, contacts initiated by a VIP, or "gold member", contacts that are related, contacts that are of a similar media type, contacts that are of different media types, contacts of a certain content, etc.

Furthermore, information relating to suboptimal routing does not need to be the only type of information pushed down to the agents by the server 110. Situations can be imagined where it would be beneficial to send all routing information to the agents. This additional information may be able to help the agents more accurately and efficiently service a given contact.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for servicing contacts, comprising:
   (a) receiving a first contact from a first customer;
   (b) identifying, a routing engine and contact selector, an optimal agent to service the first contact based on capabilities of the optimal agent and processing requirements of the first contact;
   (c) selecting, by the routing engine and contact selector, a first agent to initially service the first contact in lieu of the optimal agent initially selected to service the first contact, wherein the first agent is a suboptimal selection for servicing the first contact; and
   (d) performing at least one of the following substeps:
      (d1) generating a notification at a suboptimal routing notification agent, the notification notifying the first agent that the optimal agent was not selected to initially service the first contact; and
      (d2) after delivery of the first contact to the first agent, notifying the optimal agent that the first agent is the suboptimal selection for servicing the first contact and that the optimal agent is identified as optimal for initially servicing the first contact.

2. The method of claim 1, wherein step (d1) is performed.

3. The method of claim 1, wherein step (d2) is performed.

4. The method of claim 1, wherein both steps (d1) and (d2) are performed after delivering the first contact to the first agent.

5. The method of claim 1, wherein at least one of the first and optimal agents is further notified by the suboptimal routing notification agent of a reason why the first agent is the suboptimal selection.

6. The method of claim 1, wherein at least one of the first and optimal agents is further notified of a reason why the optimal agent is the optimal selection but is not initially selected to service the first contact.

7. The method of claim 1, wherein the optimal agent is optimal because a second contact of a second customer being serviced by the optimal agent is related to the first contact and wherein the optimal agent is not initially selected to service the first contact because the optimal agent is unavailable.

8. The method of claim 7, further comprising:
   (e) providing to the first agent at least some of the information exchanged between the second customer and the optimal agent.

9. The method of claim 7, further comprising:
   (e) including, in a first set of data structures associated with the first contact, a pointer to a second set of data structures associated with the second contact.

10. The method of claim 1, further comprising:
   (e) querying the first customer whether the first customer is willing to wait for servicing by the optimal agent rather than being assigned to the first agent.

11. A non-transitory computer readable medium comprising executable instructions operable to perform, when executed by a processor, the steps of claim 1.

12. The contact center of claim 11, wherein operation (c1) is performed.

13. The contact center of claim 11, wherein operation (c2) is performed.

14. The contact center of claim 11, wherein at least one of the first and second agents is further notified of a reason why the first agent is not the optimal selection.

15. The contact center of claim 11, wherein at least one of the first and second agents is further notified of a reason why the second agent is the optimal selection.

16. The contact center of claim 11, wherein the second agent is optimal because a second contact of a second customer being serviced by the second agent is related to the first contact.

17. The contact center of claim 16, further comprising:
a first set of data structures associated with the first contact including a pointer to a second set of data structures associated with the second contact.

18. The contact center of claim 17, further comprising:
a third set of data structures associated with a third contact including a pointer to at least one of the first set of data structures associated with the first contact and the second set of data structures associated with the second contact, wherein the third contact is related to the first contact in a first way, and wherein the third contact is related to the second contact is a second different way.

19. A contact center, comprising:
(a) a queue operable to contain a pointer to a first contact from a first customer;
(b) an automated routing engine and contact selector operable to initially identify a second agent as an optimal selection for servicing the first contact, determine that the second agent is currently unavailable to service the first contact, and then select a first agent to at least initially service the first contact in lieu of the second agent and deliver the first contact to the first agent; and
(c) a routing notification agent operable to perform at least one of the following operations:
(c1) generate a notification which, when provided to the first agent, notifies the first agent that the agent and contact selector determined the second agent to be the optimal selection for servicing the contact; and
(c2) after delivery of the first contact to the first agent, generate a notification which, when provided to the second agent, notifies the second agent that the first agent is a suboptimal selection for servicing the contact and that the second agent is the optimal selection for servicing the contact.

20. A method for servicing contacts, comprising:
(a) receiving a first contact from a first customer;
(b) identifying, by a routing engine and contact selector, a second agent as an optimal selection for servicing the first contact;
(c) determining, by the routing engine and contact selector, that the second agent is currently unavailable to service the first contact;
(d) selecting, by the routing engine and contact selector, a first agent to at least initially service the first contact in lieu of the second agent;
(e) delivering the first contact to the first agent; and
(f) notifying the first customer that the first agent is the suboptimal selection and is currently available to service the first contact and that a second agent is the optimal selection and will be available to service the first contact after an additional waiting period.

21. The method of claim 20, further comprising:
(g) receiving a first customer response from the first customer;
(h) when the first customer response is a first response, delivering the first contact to the first agent; and
when the first customer response is a second response different from the first response, delivering the first contact to the second agent.

22. The method of claim 20, wherein step (f) is performed before the first contact is delivered to the first agent.

23. A non-transitory computer readable medium comprising processor-executable instructions operable to perform, when executed, the steps of claim 20.

* * * * *